United States Patent

Jourdan

[11] 3,883,111
[45] May 13, 1975

[54] CLAPPER-TYPE CHECK VALVE

[75] Inventor: Jerry W. Jourdan, Alvin, Tex.

[73] Assignee: ACF Industries, Incorporated, New York, N.Y.

[22] Filed: Sept. 24, 1973

[21] Appl. No.: 400,454

[52] U.S. Cl. .................. 251/82; 251/86; 137/527; 137/527.4
[51] Int. Cl. ............................................ F16k 31/52
[58] Field of Search............. 137/527, 527.4, 556.3; 251/82, 86, 298

[56] References Cited
UNITED STATES PATENTS

| | | | |
|---|---|---|---|
| 373,782 | 11/1887 | McHugh | 137/527.4 |
| 991,784 | 5/1911 | Kiley | 137/527.4 |
| 2,265,595 | 12/1941 | Carlson | 137/527.4 |
| 2,504,006 | 4/1950 | Davis | 251/82 |
| 2,809,010 | 10/1957 | Ipsen et al. | 251/86 |
| 2,889,845 | 6/1959 | Kimm et al. | 251/298 X |
| 2,998,957 | 9/1961 | Vulliez | 251/298 X |

Primary Examiner—Henry T. Klinksiek
Attorney, Agent, or Firm—Eugene N. Riddle

[57] ABSTRACT

A bowl-shaped clapper-type check valve is mounted about a ball and socket joint on an arm. The arm is fixed to a shaft which may be driven manually for opening and closing the check valve. When in closed position the check valve may swing freely in one direction toward an open position and an indicator arm shows the position of the clapper valve at all times. A vane on the downstream side of the clapper valve prevents free rotation about the ball and socket joint when the check valve is open and riding on the fluid stream.

7 Claims, 8 Drawing Figures 3,883,111

CLAPPER-TYPE CHECK VALVE

BACKGROUND OF THE INVENTION

Heretofore, swing type check valves have been mounted on an arm for pivotal movement between open and closed positions. In some instances clapper-type check valves have been mounted for rotation about a pin with a relatively loose fit between the pin and clapper so that the clapper may fully seat in closed position. Such connections are especially undesirable for large clapper valves as they are subject to considerable wear and tear and sometimes result in unequal pressures being applied against the seat by the clapper.

Manual drives have been provided for opening and closing check valves but such drive connections have not normally permitted the check valve to swing freely from the closed position. The check valves heretofore when operated into a closed position have remained in such a closed position until manually operated to an open position.

DESCRIPTION OF THE PRESENT INVENTION

The present invention is directed to a valve structure having a bowl-shaped clapper-type check valve member mounted on the extended end of an arm which is mounted for swinging movement within the valve body. The bowl-shaped valve member is connected to the arm about a ball and socket joint which permits pivotal and rotative movements of the valve member relative to the arm. The clapper-type valve member is bowl-shaped with the concave surface of the valve member facing the arm with the ball and socket joint being positioned within the volume formed by the bowl-shaped valve member and generally in the area of the center of gravity of the valve member. The clapper-type valve member may weigh as much as 3,000 pounds when employed with a flow way of around 48 inches in diameter and it is desirable that the ball and socket joint about which the clapper-type valve member is supported is generally in the area of the center of gravity as this will aid in the proper seating of the valve member against the seat.

A manual drive means for moving the clapper-type valve member between open and closed positions is provided and includes a drive shaft secured to the arm and a shaft extension which projects axially of the drive shaft and is mounted for rotation relative to the drive shaft. Drive lugs are secured to the drive shaft and the shaft extension and engage each other to raise the valve member. However, in the closed position of the clapper-type valve member, the valve member may swing upwardly with the drive lugs on the drive shaft and shaft extension being out of engagement thereby to permit the valve member to ride on the liquid stream. In order to prevent the rotation of the valve member while riding on the flow stream, a vane is secured to the convex surface of the valve member and thus acts as a rudder to minimize any rotative movement of the valve about the ball and socket joint. An indicator rod is secured to the drive shaft and extends through an axial bore in the shaft extension with a position indicator mounted on the rod outside of the housing for the drive means in order to be in view for indicating the position of the clapper at all times.

In the accompanying drawings, in which one of various possible embodiments of the invention is illustrated, FIG. 1 is a sectional view of the check valve structure comprising the present invention;

Figure 1:
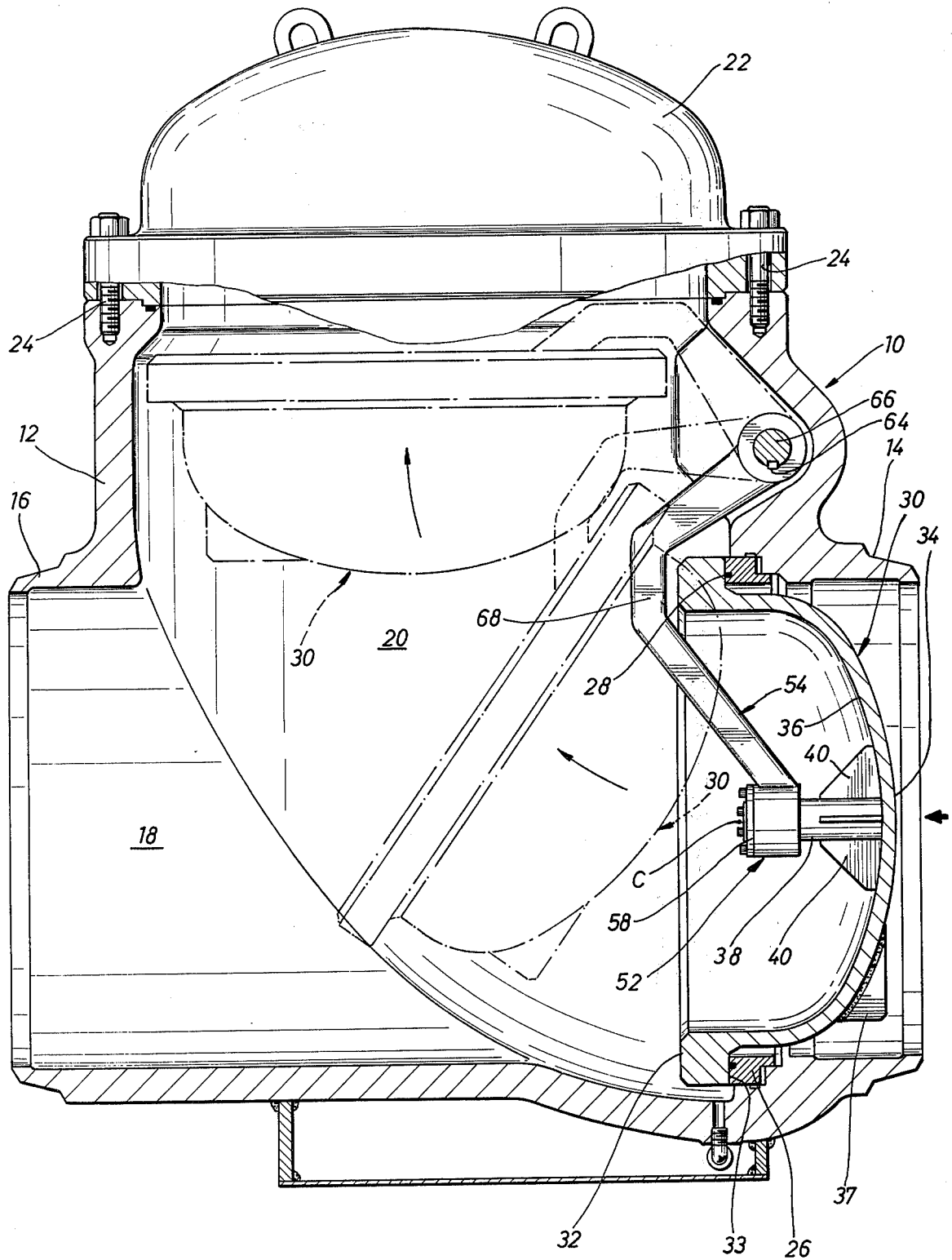
Figure 2:
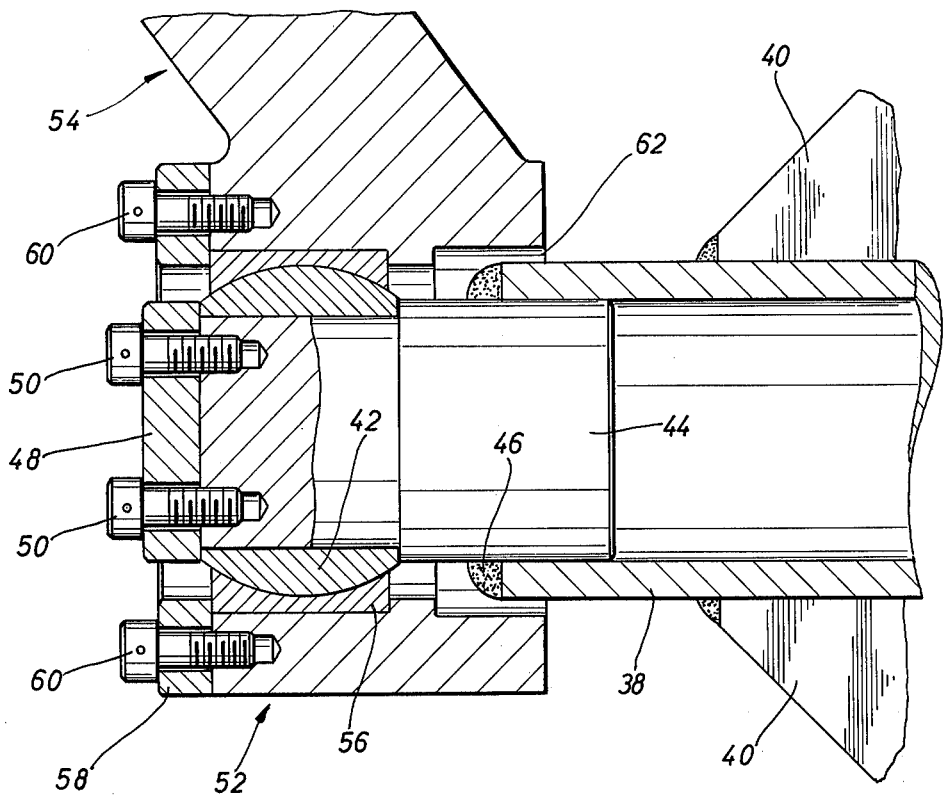
FIG. 2 is an enlarged section of the ball and socket joint supporting the clapper-type valve member to a supporter arm.
Figure 3:
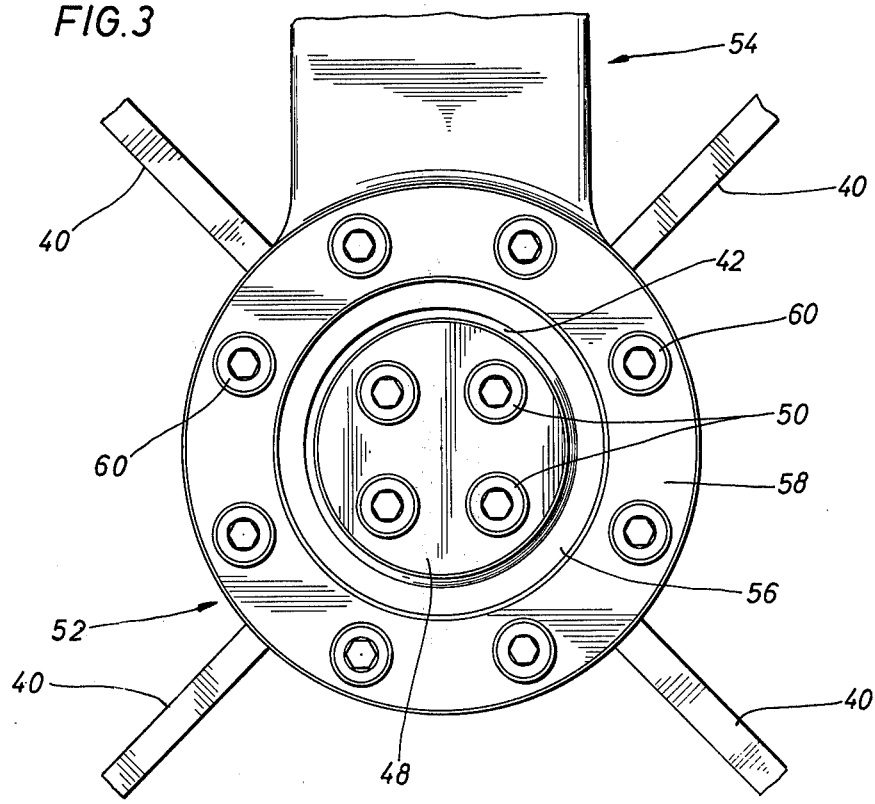
FIG. 3 is an end elevation of the ball and socket joint shown in FIG. 2.
Figure 4:
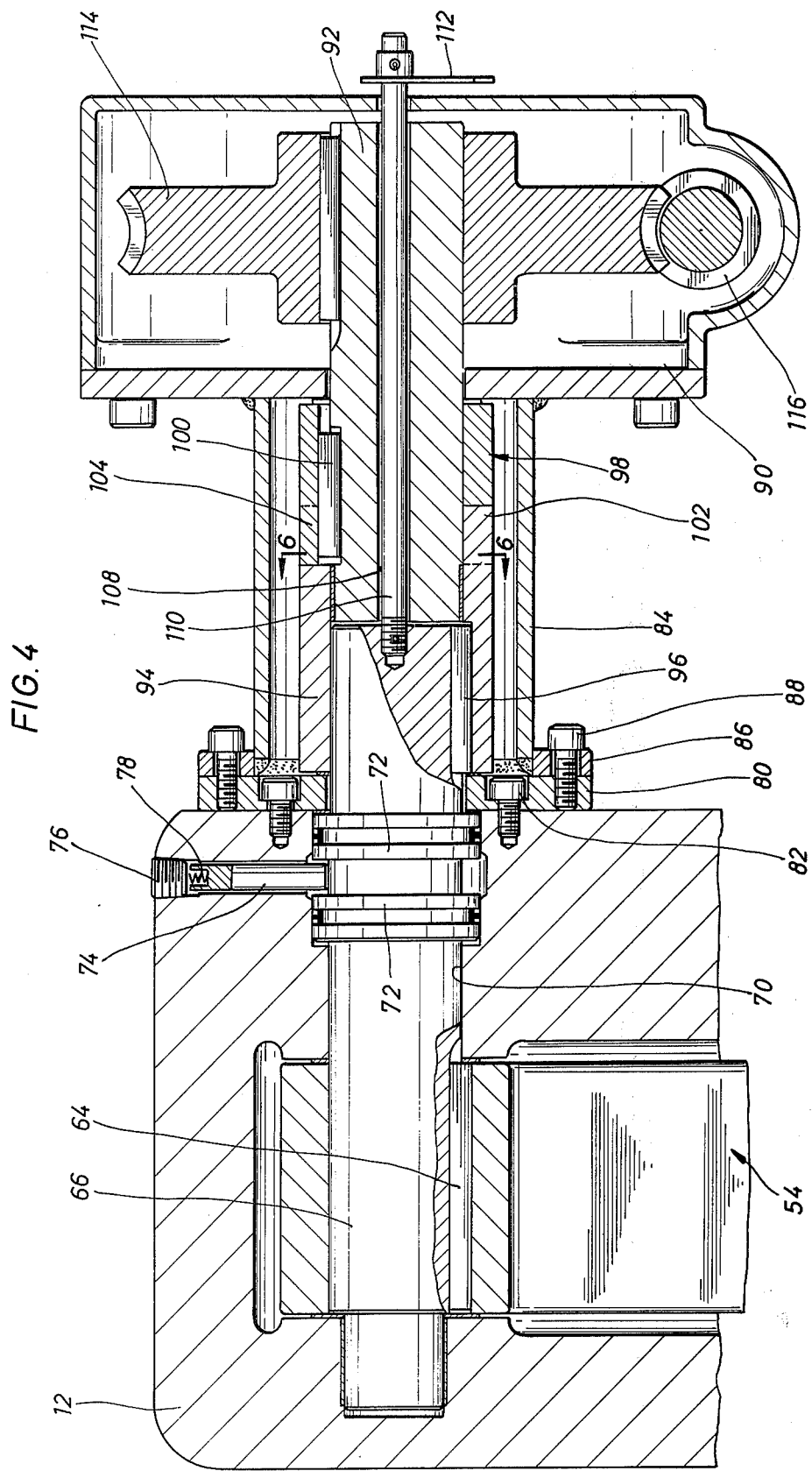
FIG. 4 is a section of the drive means for rotating the support arm for pivotal movement of the clapper-type valve member between open and closed positions.

Referring now to the drawings for a better understanding of the invention, the valve structure comprising the present invention is generally indicated at 10 and includes a body 12 having tubular conduits 14 and 16 which form a flow passage 18. Body 12 has a chamber 20 therein and the upper body portion has a bonnet 22 secured thereto by bolted studs 24. A seat ring generally indicated 26 extends about the circumference of tubular conduit 14 and has a seal 28 thereon. A clapper-type valve member generally indicated 30 is bowl-shaped and has an outer circumferential flange 32 with an inner face 33 adapted to seat on seat 26 in sealing engagement with seal 28. Bowl-shaped clapper 30 has a convex outer surface 34 and a concave inner surface 36. A tab or vane 37 extends from convex surface 34.

A tubular extension 38 is secured to the center of concave surface 36 and has reinforcing plates 40 welded to surface 36. A partial spherical ball 42 is secured to a ball support 44 which is welded at 46 to extension 38. An end plate 48 is secured to support 44 by studs 50. A hub generally indicated at 52 is mounted on an extending end of arm 54. Hub 52 has a bearing 56 secured by a circumferential ring 58. Ring 58 is secured by studs 60 to the body of hub 52. Bearing 56 and hub 52 form a socket ball 42. It is noted that a limited clearance is provided between the outer surface of extension 38 and inner circumferential surface 62 of hub 52 which receives extension 38. Extension 38 and clapper-type valve member 30 secured thereto may move in a plane generally transversely of the longitudinal axis of the flow passage only a limited amount until the outer circumference of extension 38 contacts circumferential surface 62 of hub 52.

Arm 54 is generally U-shape and has its upper end keyed at 64 to shaft 66. The ball and socket joint formed by ball 42 and bearing 56 is in generally vertical alignment with shaft 66 in the closed position of the clapper-type valve member 30 as shown in FIG. 1. Intermediate portion 68 of U-shaped arm 54 is spaced a small distance from outer flange 32 and the clearance between inner circumferential surface 62 and extension 38 permits sufficient pivoting of valve member 30 for flange 32 to contact arm portion 68 in one direction of pivoting. The center of gravity indicated at C in FIG. 1 is positioned closely adjacent the ball and socket joint which permits valve member 30 to be easily moved by arm 54. The center of gravity C is positioned within the confines of the volume formed by the bowl-shaped valve member 30 and the positioning of the ball and socket joint forwardly of the center of gravity as illustrated is particularly desirable when heavy valve members are provided as valve member 30 will tend to pivot into engagement with seat 26 when moving into closed position. With a 48 inch diameter flow way for example, valve member 30 will weigh approximately 3,000 pounds.

Figure 6:
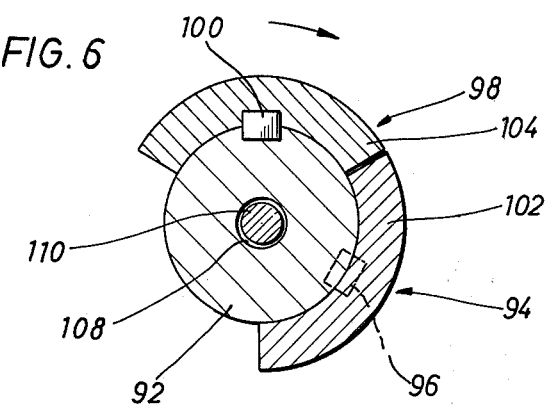
FIG. 6 is a section taken generally along line 6—6 of FIG. 4 and illustrating the drive dogs in the closed position of the clapper-type valve member.
Figure 8:
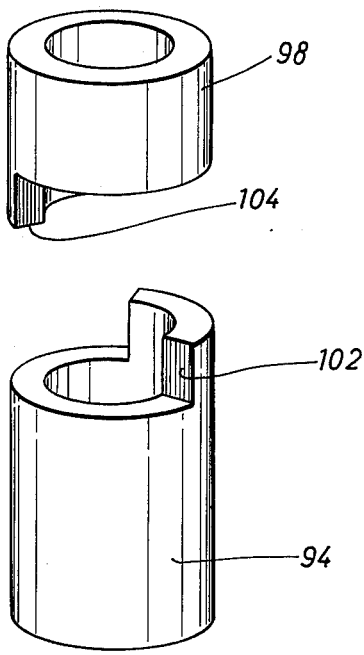
FIG. 8 is a perspective of the drive dogs shown in FIGS. 6 and 7.

Shaft 66 is mounted within a bore 70 in body 12. To retain shaft 66 within bore 70, a pair of spaced enlarged diameter flange portions 72 are provided on shaft 66 and a retainer pin 74 fits between enlarged diameter flanges 72. An end plug 76 retains pin 74 in position and a spring 78 between plug 76 and pin 74 permits a limited amount of movement of pin 74. An end plate 80 is secured by studs 82 to body 12 and aids in retaining shaft 66 in position. A shaft housing 84 has an outer flange 86 secured by studs 88 to end plate 80. A gear housing 90 is secured to shaft housing 84. A drive or operator shaft provided by shaft extension 92 is an axial extension of shaft 66 but is mounted for relative rotation. A drive dog 94 is secured by key 96 to shaft 66 and a cooperating drive dog 98 is secured by key 100 to operator shaft 92. Drive dog 94 has a drive lug 102 and drive dog 98 has a cooperating drive lug 104. As shown in FIG. 6 in the closed position of clapper-type valve member 30, lugs 102 and 104 are slightly spaced to permit movement of valve member 30 against seat 26. FIG. 6 shows the position of drive lugs 102 and 104 in the open position of clapper-type valve member 30.

Operator shaft 92 has an axial bore 108 therethrough. A position indicator rod 110 is secured to shaft 66 by a suitable threaded connection and is received within axial bore 108 of operator shaft 92. A position indicator 112 is secured to the outer end of rod 110 outwardly of housing 90 and the adjacent surface of housing 92 has open and closed positions marked thereon so that the position of clapper-type valve member 30 is indicated at all times by position indicator 112.

A worm wheel 114 is secured to operator shaft 92 and a worm 116 engages worm wheel 114 in driving relation. A handwheel 118 is secured to worm shaft 120 for rotating worm 116 to open and close clapper-type valve member 30.

Figure 7:
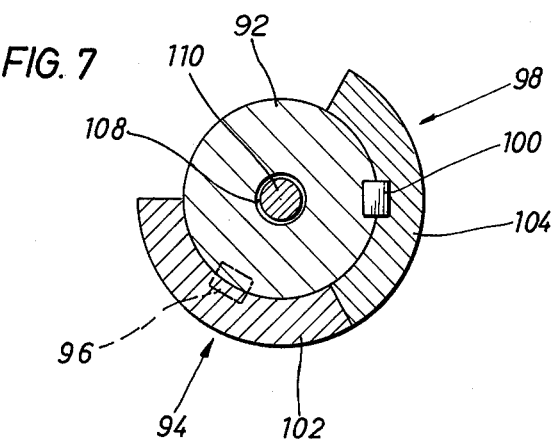
FIG. 7 is a section similar to FIG. 6 but showing the drive dogs in the open position of the clapper-type valve member.
Figure 5:
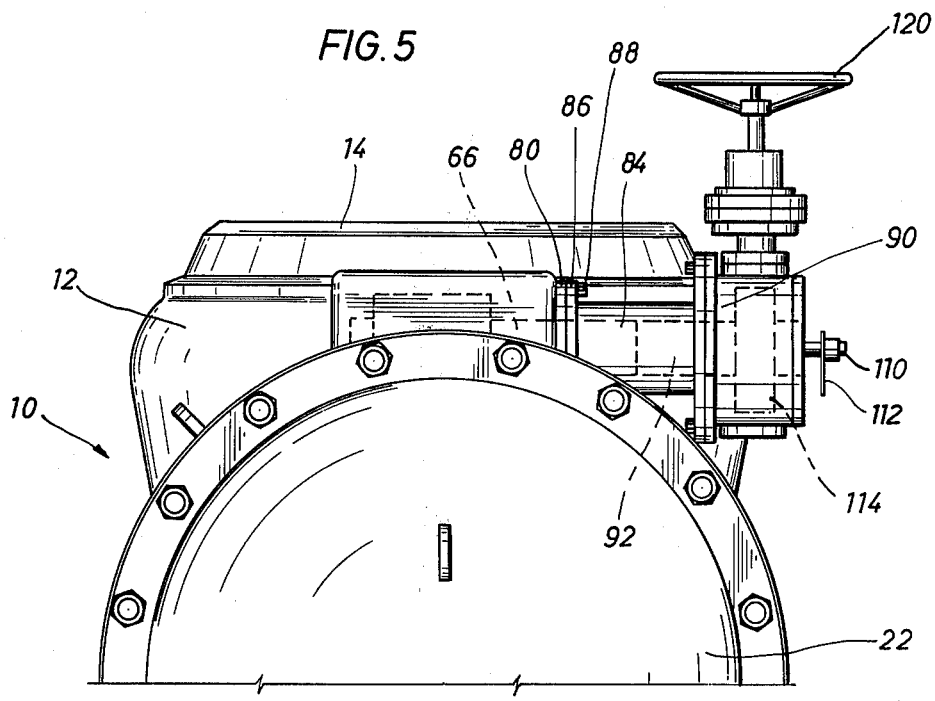
FIG. 5 is a top plan of the drive means shown in FIG. 4.

In operation, with the valve member 30 in the closed position as shown in FIG. 1, rotation of handwheel 120 rotates drive shaft 92 with lug 104 engaging lug 102 as shown in FIG. 6 thereby to rotate shaft 66. Continued rotation of handwheel 120 moves valve member 30 to the broken line indication thereof shown in FIG. 1 and drive lugs 102 and 104 are moved to the position shown in FIG. 7. To lower valve member 30 from the broken line position indicated in FIG. 1, handwheel 120 is rotated in an opposite direction to return drive lugs 102 and 104 to the position shown in FIG. 6. The weight of valve member 30 effects movement of valve member 30 from its open position to closed position as drive lug 104 is not in a driving relation to lug 102 when dog 98 is rotated in a counterclockwise position as viewed in FIGS. 6 and 7. Thus, when clapper-type valve member 30 is in closed position, valve member 30 is free to pivot upwardly in clockwise direction toward open position as drive lug 104 permits a clockwise rotation of shaft 66 as viewed in FIGS. 6 and 7. In the event valve member 30 is swung to an open position by a flow stream and convex surface 34 rides on the upper surface of the stream, vane 37 will prevent any free rotation of valve member 30 about the ball and socket connection to arm 54.

What is claimed is:

1. A check valve structure comprising, a valve body having a flow passage, a valve seat about the flow passage, a clapper type valve member, an arm connected to said valve member, a support shaft mounted on said body and fixed to said arm to support the arm for movement of the valve member between open and closed positions, drive means engaging said shaft for raising the valve member from the closed position to open position and maintaining said valve member in open position when rotated in one direction, said drive means permitting the valve member to move by gravity from an open position to a closed position when rotated in an opposite direction, said drive means permitting the valve member when in a closed position to swing freely in one direction to an open position relative to said drive means so that said valve member may open freely from a closed position without the actuation of said drive means.

2. A check valve structure as set forth in claim 1 wherein said drive means includes a shaft extension projecting axially of said support shaft and adapted to rotate relative to said shaft, and drive lugs secured to said support shaft and said shaft extension engaging each other for raising the valve member and being out of engagement when the valve member freely swings open from closed position.

3. A check valve structure as set forth in claim 2 wherein said shaft extension has a central bore therethrough, an indicator rod is secured to said drive shaft for rotation therewith and is received within said central bore for relative rotation, and a valve position indicator is secured to an end of said rod outwardly of said shaft extension to indicate the position of said clapper-type valve member.

4. A check valve structure as set forth in claim 2 wherein a worm wheel is secured to said shaft extension, a worm engages said worm wheel, and handwheel is connected to said worm for rotation thereof.

5. A check valve structure comprising a valve body having a flow passage, a bowl-shaped clapper-type valve member adapted to seat about the flow passage in closed position, said bowl-shaped valve member having a convex surface on one side thereof and a concave surface on the other side thereof, a driven shaft, means connecting the driven shaft to the concave surface of the valve member generally adjacent the center thereof for movement of the valve member between open and closed positions, drive means engaging the driven shaft for raising the valve member from the closed position to open position and maintaining the valve member in open position when rotated in one direction, said drive means permitting the valve member to move by gravity from an open position to a closed position when the drive means is rotated in the opposite direction, the drive means permitting the valve member when in a closed position to swing freely in one direction to an open position relative to the drive means so that the valve member may open freely from a closed position without actuation of the drive means, the drive means including a shaft extension projecting axially of the driven shaft and mounted for rotation relative to the driven shaft, cooperating means secured to the driven shaft and the shaft extension in engagement with each other for raising the valve member to an open position and being out of engagement when the valve member swings open from a closed position, the shaft extension having a central bore therethrough, an indicator rod secured to the driven shaft for rotation therewith and received within the central bore, and a valve position indicator secured to an end of the rod outwardly of the shaft extension to indicate the position of the clapper-type valve member at all times.

6. A swing check valve structure comprising, a valve body having a flow passage, a valve seat about the flow passage, a bowl-shaped clapper-type valve member having a convex surface on one side and a concave surface on the opposite side thereof, a support member having one end fixed to the concave surface of the valve member generally adjacent the center thereof, an arm supported adjacent one end to the valve body and mounted adjacent the other end to the support member about a ball and socket joint, the ball and socket joint being positioned within the volume formed by the bowl-shaped valve member and generally in the area of the center of gravity of the valve member, a shaft connected to said arm for movement of said arm and valve member between open and closed positions, said shaft and said ball and socket joint being positioned generally in a plane extending transversely of the longitudinal axis of the flow passage, the arm being generally U-shaped to fit about the outer circumference of the bowl-shaped valve member, and drive means to rotate said shaft in one direction from the closed position to the open position thereof, said drive means in the closed position of the valve member permitting the valve member to swing freely from the closed position in one direction.

7. A swing check valve structure comprising, a valve body having a flow passage, seat means about the flow passage, a swing check valve member adapted to seat on said valve seat in a closed position to prevent flow through the flow passage in one direction, means connected to said valve member to support the valve member for movement between open and closed positions including a support shaft mounted on said body for rotation, drive means engaging said shaft for raising the valve member from the closed position to open position and maintaining said valve member in open position when rotated in one direction, said drive means permitting the valve member to move from an open position to a closed position when rotated in an opposite direction, said drive means permitting the valve member when in a closed position to swing freely in one direction to an open position relative to said drive means so that said valve member may open freely from a closed position without the actuation of said drive means.

* * * * *